Figure 1:
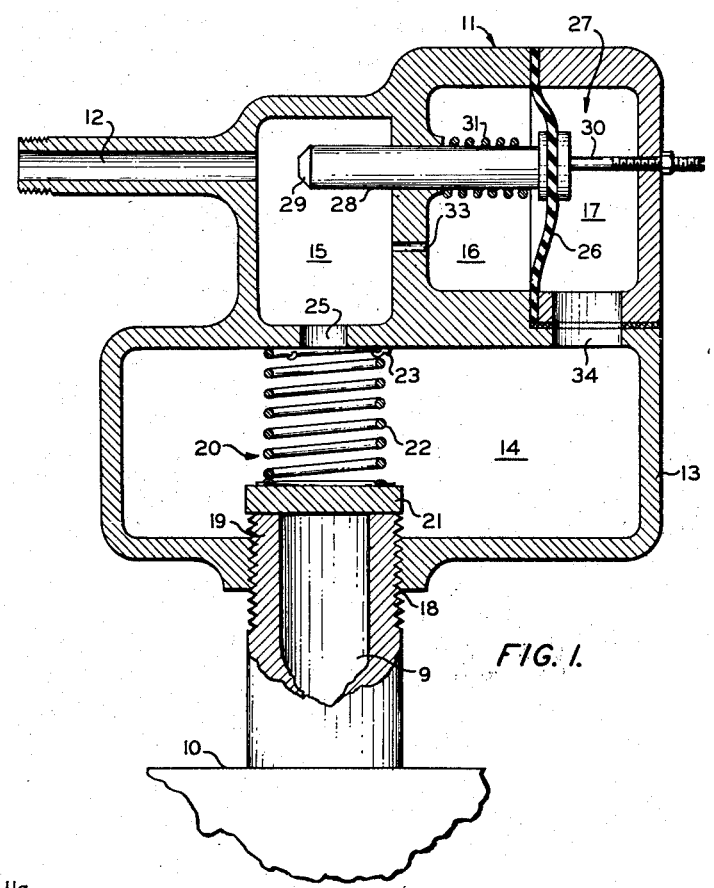

Dec. 14, 1954  E. A. MALICK  2,696,831
PRESSURE RELIEF SYSTEM
Filed Feb. 13, 1951

INVENTOR.
E. A. MALICK
BY
Hudson & Young
ATTORNEYS

United States Patent Office 2,696,831
Patented Dec. 14, 1954

2,696,831

PRESSURE RELIEF SYSTEM

Emil A. Malick, Bartlesville, Okla., assignor to Phillips Petroleum Company, a corporation of Delaware Application February 13, 1951, Serial No. 210,768

7 Claims. (Cl. 137—505)

This invention relates to a system for releasing vapors from a fluid-containing vessel when the pressure therein becomes excessive.

Heretofore, pressure relief valves have been commonly utilized to relieve excessive pressures developed in a closed vessel containing both liquid and vapor, such as an aircraft fuel tank or a tank for holding a liquefied petroleum gas, such as propane and butane, where the vapor pressure developed might cause rupture of the vessel if such relief valve were not provided. When such relief valves are actuated, there is oftentimes a substantial amount of liquid entrained in the vapor passing through the valves. Although, in many instances, the amount of liquid thus lost is not substantial, in certain applications, particularly in aircraft fuel tanks, the fire or explosion hazard is increased and sufficient liquid fuel can be lost as to substantially reduce the effective flight range of the aircraft. It is believed that this entrainment, referred to in the art as "slugging," is caused by excessive vapor velocities within the vessel, these vapor velocities being so high as to carry a large quantity of liquid with them as they pass through the relief valve.

In accordance with this invention, entrainment of liquid with the vapor is substantially or completely eliminated by providing an intermittent release of the vapor rather than a continuous high velocity release. During a very short interval of operation, the rate of travel of the vapor may be very high without causing entrainment of liquid since globules of liquid cannot be accelerated from a stationary state to a sufficient velocity to escape from the tank during such short period of operation. It is a feature of the invention that the valve can be so adjusted, in conjunction with a specific vessel of known geometry, so that there is a continuous release of vapor until the critical velocity is reached at which substantial entrainment of liquid takes place, the discharge thereafter being intermittent to minimize or prevent entrainment as the pressure within the vessel becomes higher. This regulating action can take place in conjunction with the action of a relief valve or without cooperating with a relief valve.

It is an object of the invention to provide an improved pressure release system for releasing vapors from a vessel where the pressure therein becomes excessive.

It is a further object to provide a system in which a relief valve is intermittently operated when the vapor velocity in a vessel containing liquid and vapor becomes sufficiently high as to cause substantial entrainment of liquid with the vapor.

It is a still further object to provide a practical system which is rugged in operation, reliable and can be economically manufactured.

Figure 2:
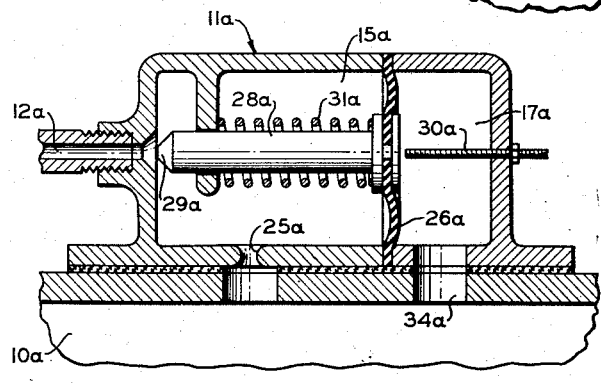

Various other objects, advantages and features of the invention will become apparent from the following detailed description taken in conjunction with the accompanying drawings, in which Figure 1 is a vertical sectional view of the pressure release system of this invention; and Figure 2 is a vertical sectional view of a modification of the invention.

Referring now to the drawing in detail, I have shown a line 9 communicating with a closed vessel 10 containing liquid and vapor. This vessel can be, among other things, an aircraft fuel tank or a container for liquefied petroleum gases, such as propane and butane. A pressure relief system 11 of novel construction is interposed between the line 9 and a conduit 12 through which the vapors are discharged for disposition as desired. In the case of an aircraft fuel tank, the conduit 12 can lead overboard through a vent, to the combustion inlet, to the intake manifold, or to any other point of disposition as desired. In the case of a storage vessel for liquefied petroleum gases, the conduit 12 is normally vented to the atmosphere.

The pressure release system 11 includes a casing 13, the walls of which define chambers 14, 15, 16 and 17, the purpose of which will be hereinafter explained. The line 9 extends into the chamber 14, as through a threaded connection 18, and its inner end constitutes a valve seat 19 for a pressure relief valve 20 including a valve head 21 which is urged into engagement with the valve seat 19 by a spring 22, the spring being secured to a wall of chamber 14 by suitable supports 23.

The chamber 14 communicates with chamber 15 through a restricted orifice 25 and the chamber 15, in turn, communicates with the conduit 12 to permit venting of vapors when the relief valve head is lifted off its seat. In effect, chamber 15 constitutes an extension of conduit 12 which is downstream from the region of closure thereof by plunger 28.

The chambers or compartments 16, 17 are defined by a diaphragm 26 of an auxiliary valve 27, the diaphragm having a plunger 28 secured thereto which extends through the wall connecting chambers 15, 16 and has a head 29 adapted to close the inner end of conduit 12. The diaphragm 26 is urged to a position wherein plunger 28 engages an axially adjustable stop 30 by a spring 31. It will be further noted that the chambers 15, 16 are connected by a small vent opening 33 while chambers 14, 17 are interconnected by an orifice or opening 34 of substantially larger size than the orifice 25 or vent 33.

The operation of the system is as follows: When the vapor pressure in the vessel 10 becomes excessive, relief valve 20 is opened so that the vapor escapes through orifice 25 and chamber 15 to the conduit 12. Due to the restricted nature of the orifice 25, as compared to the size of line 9, the pressure in chambers 14, 17 builds up much more rapidly than the pressure in chambers 15 and 16. This pressure differential between opposite sides of the orifice 25 causes the diaphragm 26 and plunger 28 to move in a leftward direction, thereby to close conduit 12 after a predetermined interval, the length of which is determined by the stiffness of spring 31, the adjustment of stop 30, the size of the diaphragm 26, and the rapidity with which the pressure differential builds up on opposite sides of the diaphragm. These characteristics are so chosen that the valve 27 is operated before any substantial amount of liquid becomes entrained in the vapor escaping through conduit 12.

Responsive to the closure of valve 27, the pressure in chambers 14, 15 and 17 is rapidly equalized with respect to the pressure in line 9 with the result that relief valve 20 is reseated. The pressure in chamber 16, however, does not build up as rapidly as does the pressure in chambers 14, 15 and 17 due to the small size of orifice 33 as compared with the sizes of the orifices 25 and 34. Therefore, valve 27 remains closed until sufficient vapor passes through vent 33 as to raise the pressure in chamber 16 sufficiently that spring 31 can cause opening of the auxiliary valve 27. Thereupon, the vapor in chambers 14, 15 and 17 is vented to the atmosphere or other disposal through conduit 12 with resultant reduction in the pressure of these chambers. If the pressure in line 9 is still excessive, relief valve 20 is again actuated when the pressure in chamber 14 drops to a sufficient extent as to cause such subsequent actuation of the relief valve. This initiates a new cycle of operation, the valves being periodically opened and closed until the excessive pressure in line 9 is relieved. Due to the intermittent operation just described, entrainment of liquid with the vapors escaping through conduit 12 is eliminated or substantially minimized.

It will be understood that the size of orifice 25, the stiffness of spring 31, the size of diaphragm 26, and the position of stop 30 can be suitably adjusted so that the pressure differential between chamber 15, on the one hand, and chambers 14 and 17, on the other hand, is not sufficient to cause actuation of auxiliary valve 27 until a predetermined vapor velocity is reached, this vapor velocity being selected as the maximum permissible velocity which will not cause substantial entrainment of liquid in the escaping vapors. It will be further understood that dash pots can be provided, if desired, upon the plunger 28 and relief valve 20 to provide further means for controlling the length of the respective operating and non-operating periods of the valves during each cycle of operation.

In a modification of the invention, a tank 10a has a modified valve assembly 11a suitably secured thereto, the assembly 11a being divided into chambers 15a and 17a by a diaphragm 26a. Carried by the diaphragm is a plunger 28a having a head 29a which cooperates with a complementary valve seat formed at the region of attachment of a vent conduit 12a. A spring 31a urges the plunger 28a and diaphragm 26a in a rightward direction, Figure 2, toward a stop 30a, the stiffness of the spring, and the size of the diaphragm being so adjusted as to provide a vent opening between head 29a and its associated seat which is of greater extent than the opening in an orifice member 25a connecting chamber 15a to the interior of the tank 10a. Chamber 17a communicates with the interior of the tank through conduit 34a which is of sufficient size that the pressure in these two chambers remains equal for all practical purposes.

In the operation of the modified form of the invention, a small amount of vapor is normally vented through conduit 12a, this material flowing through orifice 25a and thereby producing a pressure drop so that the pressure in chamber 15a is somewhat less than the pressure in chamber 17a. Under such normal conditions, the plunger 28a is shifted toward the valve seat formed at the end of conduit 12a, but not to such an extent as to interfere with the normal venting of vapor through the conduit 12a. If the rate of venting becomes excessive, that is, if the rate of discharge is sufficient that liquid may be entrained with the escaping vapor, the increase in flow rate produces an additional drop in the pressure in chamber 15a as compared with the pressure in chamber 17a, this pressure drop occurring through the action of orifice 25a. As a result, the head 29a is moved an additional distance to the left with the result that the vent valve is either partially or completely closed, thereby reducing or stopping the flow of vapors through the vent conduit 12a with the result that liquid entrainment is prevented. Thereupon, the pressure in the chambers 15a, 17a tends to equalize with the result that the plunger and head return toward their original positions, thus permitting additional vapor to be vented from the tank. The action is such that an intermittent closing action of the plunger is obtained when the tank pressure becomes excessive so as to permit proper venting without any liquid entrainment, as described in connection with the modification of Figure 1.

While the invention has been described in connection with a present, preferred embodiment thereof, it is to be understood that this description is illustrative only and is not intended to limit the invention, the scope of which is defined by the appended claims.

I claim:

1. In a pressure relief system, the combination, with a vessel containing a fluid under pressure, and a discharge conduit, of a valve structure including a relief valve communicating with said vessel, said valve being adjusted to open at a predetermined pressure, conduit means including a restricted orifice connecting the outlet of said relief valve with said conduit, and an auxiliary valve responsive to the pressure differential on opposite sides of said orifice, said auxiliary valve being constructed and arranged to close said conduit when the pressure differential is such that the conduit pressure is substantially less than the pressure at the outlet of said relief valve, and to open said conduit responsive to a selected decrease in said pressure differential.

2. In a pressure relief system, the combination, with a vessel containing a fluid under pressure, and a discharge conduit, of a valve structure including a relief valve communicating with said vessel, said valve being adjusted to open at a predetermined pressure, conduit means including a restricted orifice connecting the outlet of said relief valve with said conduit, and an auxiliary valve responsive to the pressure differential on opposite sides of said orifice, said auxiliary valve being constructed and arranged to close said conduit when the pressure differential is such that the conduit pressure is substantially less than the pressure at the outlet of said relief valve, and to open said conduit a predetermined interval after a predetermined decrease in said pressure differential.

3. In a pressure relief system, the combination, with a vessel containing a liquid and a vapor, and a discharge conduit, of a valve structure including a relief valve communicating with said vessel, means defining a pressure chamber communicating with the outlet of said relief valve, an orifice connecting said chamber with said conduit, and a spring biased diaphragm valve to close said conduit, one side of said diaphragm communicating with said chamber, and the other side of said diaphragm communicating with a portion of said conduit upstream of the diaphragm valve closure portion thereof.

4. In a pressure relief system, the combination, with a vessel containing a liquid and a vapor, and a discharge conduit, of a valve structure including a relief valve communicating with said vessel, means defining a pressure chamber communicating with the outlet of said relief valve, an orifice connecting said chamber with said conduit, and a spring biased diaphragm valve to close said conduit, one side of said diaphragm communicating with said chamber, a chamber communicating with the other side of said diaphragm and means including a vent of restricted size as compared with said orifice for establishing communication between said last-mentioned chamber and said conduit at a region thereof upstream from the zone of closure by said diaphragm valve.

5. In a pressure relief system, the combination, with a vessel containing a liquid and a vapor, and a discharge conduit, of a valve structure including a relief valve communicating with said vessel, means defining a pressure chamber communicating with the outlet of said relief valve, means defining a chamber constituting an enlargement of said conduit, an orifice connecting said chambers, an auxiliary valve including a plunger extending into said conduit chamber to close said conduit, a valve body having a diaphragm therein dividing it into two compartments, said plunger being operatively connected to said diaphragm, a spring urging said diaphragm toward one of said compartments, an opening connecting said one compartment to said pressure chamber, and means for effecting communication between the other compartment and said conduit chamber.

6. In a pressure relief system, the combination, with a vessel containing a liquid and a vapor, and a discharge conduit, of a structure including a relief valve communicating with said vessel, means defining a pressure chamber communicating with the outlet of said relief valve, means defining a chamber constituting an enlargement of said conduit, an orifice connecting said chambers, an auxiliary valve including a plunger extending into said conduit chamber to close said conduit, a valve body having a diaphragm therein dividing it into two compartments, said plunger being operatively connected to said diaphragm, a spring urging said diaphragm toward one of said compartments, an opening connecting said one compartment to said pressure chamber, and means including a vent of substantially smaller size than said orifice connecting the other compartment of said auxiliary valve with said conduit chamber.

7. In a pressure relief system, the combination, with a vessel containing a liquid and a vapor, and a discharge conduit, of a valve structure including a relief valve communicating with said vessel, means defining a pressure chamber communicating with the outlet of said relief valve, means defining a chamber constituting an enlargement of said conduit, an orifice connecting said chambers, an auxiliary valve including a plunger extending into said conduit chamber to close said conuduit, a valve body having a diaphragm therein dividing it into two compartments, said plunger being operatively connected to said diaphragm, a spring urging said diaphragm toward one of said compartment, an adjustable stop limiting the movement of said diaphragm into said one compartment, an opening connecting said one compartment to said pressure chamber, and means including a vent of substantially smaller size than said orifice connecting the other compartment of said auxiliary valve with said conduit chamber.

References Cited in the file of this patent

UNITED STATES PATENTS

| Number | Name | Date |
| --- | --- | --- |
| 1,490,654 | Wylie | Apr. 15, 1924 |
| 2,497,793 | Ransome | Feb. 14, 1950 |
| 2,502,525 | Kruger | Apr. 4, 1950 |
| 2,543,920 | McCabe, Jr. | Mar. 6, 1951 |
| 2,560,948 | Hannibal et al. | July 17, 1951 |
| 2,569,554 | Buttolph | Oct. 2, 1951 |